United States Patent [19]
Nelson

[11] 3,732,938
[45] May 15, 1973

[54] WHEELCHAIR WEIGHING PLATFORM
[76] Inventor: Wayne E. Nelson, 3112 Wulder Avenue, Sarasota, Fla.
[22] Filed: June 1, 1971
[21] Appl. No.: 148,538

[52] U.S. Cl. .................. 177/126, 177/136, 177/161, 177/245, 177/253, 177/260
[51] Int. Cl. ........................ G10g 19/02, G10g 21/22
[58] Field of Search ........... 177/161–163, 144, 145, 148, 149, 126, 127, 245, 264, 1, 132, 136, 134, 135, 128, 260, 253

[56] References Cited

UNITED STATES PATENTS

| | | | |
|---|---|---|---|
| 3,630,299 | 12/1971 | Albagli | 177/253 |
| 7,562 | 8/1850 | Houston | 177/161 |
| 329,100 | 10/1885 | Tillmeyer et al. | 177/253 |
| 433,516 | 8/1890 | Charles et al. | 177/163 |
| 1,667,717 | 5/1928 | Brinton | 177/161 |
| 2,560,945 | 7/1951 | Goldberger | 177/144 |
| 2,823,911 | 2/1958 | Murphy | 177/161 |
| 2,860,868 | 11/1958 | Wells | 177/145 |
| 2,990,899 | 7/1961 | DeBella | 177/245 |
| 3,135,401 | 6/1964 | Schramm | 177/132 |
| 3,279,549 | 10/1966 | Feinberg et al. | 177/126 |
| 3,360,062 | 12/1967 | Potter | 177/210 |

FOREIGN PATENTS OR APPLICATIONS

| | | | |
|---|---|---|---|
| 579,305 | 7/1959 | Canada | 177/253 |
| 1,125,025 | 8/1968 | Great Britain | 177/245 |

*Primary Examiner*—Richard B. Wilkinson
*Assistant Examiner*—Stanley J. Witkowski
*Attorney*—Stefan M. Stein

[57] ABSTRACT

A device fore modifying conventional weighing scales so that a person confined to a wheelchair may weigh himself without assistance from others while in the wheelchair. A platform for supporting a wheelchair or like device is fixed to connecting cross members which in combination with a plurality of support beams form a base for mounting the platform on weighing scales. The cross members and support beams are designed so that they may be adjusted to allow mounting the platform on scales of various size and shapes.

4 Claims, 5 Drawing Figures

PATENTED MAY 15 1973
3,732,938
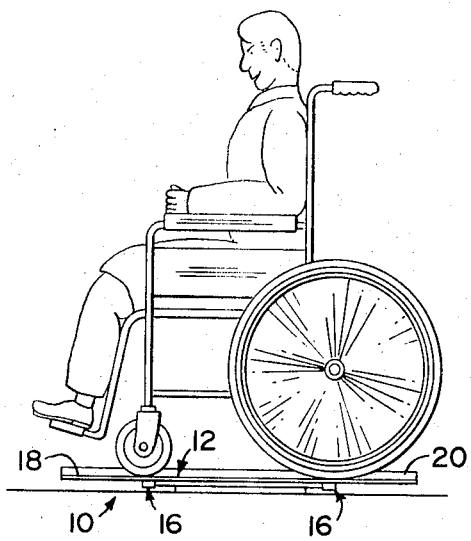
FIG. 1
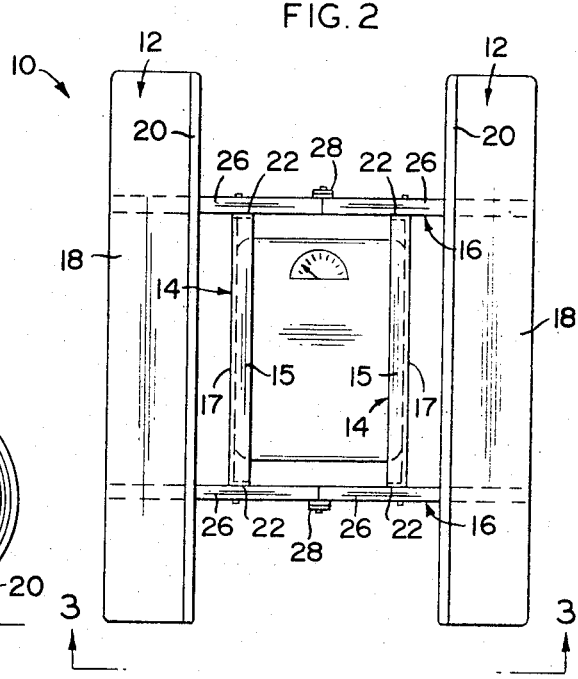
FIG. 2
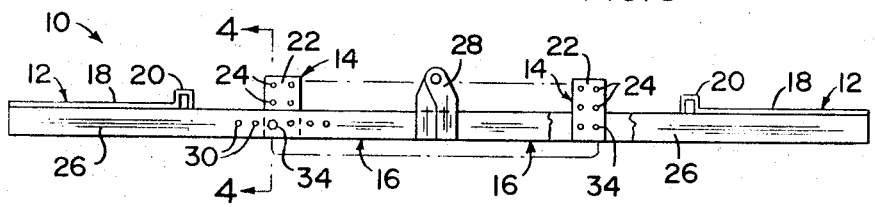
FIG. 3
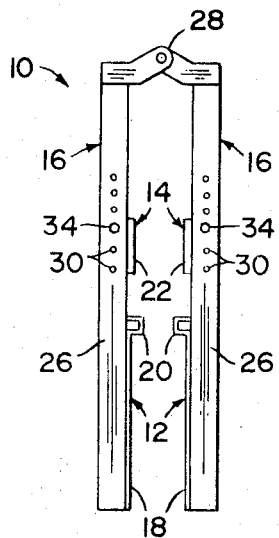
FIG. 5
FIG. 4
INVENTOR.
WAYNE E. NELSON
BY Law Offices of
Stefan M. Stein
ATTORNEY.

WHEELCHAIR WEIGHING PLATFORM

BACKGROUND OF THE INVENTION

1. Field of Invention

This invention relates to a device for modifying conventional weighing scales. More specifically, this invention relates to a platform fixed to an adjustable base for mounting on conventional scales to permit weighing persons in wheelchairs.

2. Description of Prior Art

A survey of the prior art discloses a number of devices which have been used to modify various scales for weighing specific articles. As with the present invention these weighing devices are provided for a very specific or specialized need and therefore are not readily adaptable to other uses.

Some of the devices found in the prior art used to modify available weighing scales feature weighing platforms for weighing vehicular devices. As dictated by their use, these platforms are of large and heavy construction. Usually these are designed for use in combination with a particular type scale. Where these platforms include runners for positioning the freight trucks or the like during the weighing procedure, the runners may be adjustable so as to correspond to the width of the wheels of the particular load being weighed.

Other devices found simply consist of some container means mounted or otherwise arranged on the weighing surface of a conventional scale so that the subject matter to be weighed may be placed in the container. The combined weight of the container and product is thereby registered on the scales.

Still other devices employ a hook or other carriage means to support the load. Through a transfer mechanism, the weight of the load is thereby registered on the scales.

These and many other such devices are clearly adequate for the specific task for which they are designed. However, because of their particularized design and structure none of these fulfill the needs provided for by the present invention.

SUMMARY OF THE INVENTION

This invention relates to a device for weighing wheeled vehicles such as a wheelchair and more particularly for weighing people confined to a wheelchair whereby such persons may weigh themselves without assitance from others. People confined to wheelchairs either out of desire or need to be weighed are unable to do so without assistance from others due to their relative immobility. In addition, some persons for medical reasons or because they lack the requisite physical strength cannot be easily weighed even with assitance.

The present invention comprises adjustable weighing platform designed for use in combination with conventional type bathroom scales so that a person confined to a wheelchair may position himself on the platform and thereby weight himself while in the wheelchair. Of course, this invention is not limited to use with bathroom type scales but may be adapted to any similar scale device.

The platform comprises a pair of runners on which the wheels of the chair are positioned during weighing. The runners, which are parallel to the longitudinal axis of the scale, are arranged to provide a means for easily rolling a wheelchair on and off the platform. The platform or runners are fixed to a pair of connecting cross members which in combination with a plurality of support beams form a base for mounting the platform on the weighing scales. The support means comprising two adjustable beams or channels, which are placed over the edges of the scales, are substantially parallel to the runners and provided with end plates at each end of the support beams. Holes formed in these end plates are used in combination with corresponding holes formed in the cross beams, to be described later, as a means of adjusting the position of the platform relative to the weighing scale.

The platform is connected to the support beams by means of two cross members at essentially right angles to the runners and the support beams. A series of holes in the cross members allow these mounting channels, in combination with the holes provided in the end plates of the supporting beams, to be adjusted to accommodate various size scales. In addition, these cross members are hinged so as to allow the platform to be folded and stored in a relatively small area when not in use.

In operation, the support beams are placed on opposite sides of the weighing scales and extend the length thereof. With the cross members unfolded, the runners or platform are placed outside the support beams and substantially parallel to the support beams. In this position, the end plates on the support beams will be inside the cross members and essentially parallel to the vertical plate of the cross members. Depending upon the height and width of the particular scales employed, the operator aligns the appropriate hole formed in the cross members with the appropriate hole formed in the end plates of the support beams. The operator then secures the cross members and support beams in position through the use of a common bolt and nut or like connecting means.

With the invention thus assembled and mounted on the weighing scales the person confined in the wheelchair merely approaches the runners and positions himself over the scales on the runners to register the combined weight of himself and the wheelchair. Having read the scales, it is a simple matter to roll off the runners.

The invention accordingly comprises the features of construction, combination of developments, and arrangement of parts which will be exemplified in the construction hereinafter set forth in the scope of the invention will be indicated in the claims.

BRIEF DESCRIPTION OF THE DRAWINGS

For a fuller understanding of the nature and objects of the invention, reference should be made to the following detailed description taken in connection with accompanying drawings in which:

FIG. 1 shows a person in a wheelchair positioned on the platform mounted on the scales for weighing.

FIG. 2 shows the top view of the weighing platform fully assembled and mounted on the bathroom scales.

FIG. 3 shows an end view of the assembled invention taken along line 3—3.

FIG. 4 shows cross sectional view along line 4—4.

FIG. 5 shows the cross members folded at the hinge for storage.

Similar reference characters refer to similar parts throughout the several views of the drawings.

As shown in FIGS. 1 and 2, the present invention is a device generally indicated at 10, designed for modifying conventional bathroom scales. The weighing device 10 is comprised of a platform means 12, support means 14 and a connecting means 16.

The platform means 12 includes runners 18 and lip 20 located on the inner side of runners 18 to provide a guide means. The runners 18, arranged parallel to each other along the longitudinal axis of the scale, are essentially flat in order that the wheelchair may be positioned on the runners 12 during weighing.

Support beams 14 each comprise a two sided L-shaped channel with a first fastening means which includes end plates 22 vertically mounted at the extremities of each support beam 14. Formed in these vertical end plates 22 is a series of paired holes 24 arranged in the vertical plane of end plates 22. These end plates 22 may or may not be an integral part of the support beams 14.

Fixed substantially at right angles to runners 18 are parallel cross members 16. Each cross member 16 is comprised of two similar elements 16 hinged and held together by hinge 28. In addition, cross members 16 includes a second fastening means which comprises a plurality of holes 30 formed along vertical face 32. The plurality of holes 30, in combination with holes 24 formed in the end plates 22 are so arranged as to provide an adjustment means for the platform 18 relative to the weighing device.

In operation, the support beams 14 are mounted along the longitudinal axis of the scale so that the top side 15 of the support beam 14 engages the top of the scale. Side 17 is so arranged to provide a support moment to the support beam 14 along the side of the scale. Cross members 16 are then unfolded to full extent at hinge 28. In this extended position with the runners 18 arranged outside and substantially parallel to the support beam 14, cross members 16 are located in the approximate position relative to the support beams 14 as desired. The proper hole 30 in the cross member 16 is then determined, dependent upon the width of the particular scales employed. The corresponding vertical hole formed in the end plates 22 is then decided upon, depending upon the height at which the platform is desired to be positioned. With corresponding holes 30 and 24 selected, the operator aligns the holes and attaches the cross members 16 to support beams 14 in position by the use of a common bolt 34 and nut 36 or like connecting means. With device 10 fully assembled a confined person merely approaches runners 18 and positions himself while in the wheelchair on parallel runners 18. Having read the weight registered on the scales, the user merely wheels himself off the scales.

By connecting cross members 16 to support beams 14 by means of a single bolt 34 and nut 36 combination, the operator may rotate support beams 14 about these connecting means such that the tops of support beams 14 will not strike each other when device 10 is folded about hinges 28 for storage.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, all statements of the scope of the invention which, as a matter of language, might be said to fall there between. Now that the invention has been described,

What is claimed is:

1. A wheelchair weighing device designed for use with a weighing scale, said device comprising; a platform means comprising at least one substantially flat surface configured to support a wheelchair thereon, a base comprising a support means for mounting said platform means on the weighing scale and a connecting means interconnecting said platform means and said support means to hold said platform means and said support means in fixed position relative to each other such that weight placed on said platform means is transferred to said support means and registered on the weighing scale, said support means further including a first fastening means comprising end plates formed on said support means, said plates including a plurality of holes arranged to cooperate with said connecting means to adjust the position of said platform means relative to said support means.

2. A device as in claim 1 wherein said connecting means includes a second fastening means to attach said connecting means to said support means.

3. A device in claim 2 wherein said second fastening means comprises a series of holes formed in said connecting means and arranged to cooperate with said support means such that the position of said platform means may be adjusted relative to said support means.

4. A device of claim 1 wherein said connecting means comprises at least one cross-member connected to said platform means and fastened to said support means to fix the position of said platform means relative to said support means, said cross-member comprising a plurality of elements hingedly attached to one another whereby said device is foldable.

* * * * *